(12) United States Patent
Talbot et al.

(10) Patent No.: US 10,402,727 B2
(45) Date of Patent: Sep. 3, 2019

(54) METHODS FOR EVALUATING AND SIMULATING DATA

(71) Applicant: Epistemy Limited, Edinburgh (GB)

(72) Inventors: Jack Leslie Talbot, Edinburgh (GB); Andrew Spence, Edinburgh (GB); Daniel John Boa, Inverness (GB)

(73) Assignee: EPISTEMY LIMITED, Edinburgh (GB)

( * ) Notice: Subject to any disclaimer, the term of this patent is extended or adjusted under 35 U.S.C. 154(b) by 867 days.

(21) Appl. No.: 14/482,910

(22) Filed: Sep. 10, 2014

(65) Prior Publication Data

US 2015/0100773 A1    Apr. 9, 2015

Related U.S. Application Data

(60) Provisional application No. 61/876,712, filed on Sep. 11, 2013.

(30) Foreign Application Priority Data

Sep. 11, 2013   (GB) .................................. 1316207.8
Sep. 11, 2013   (GB) .................................. 1316208.6

(51) Int. Cl.
*G06N 3/12*    (2006.01)
*G06N 3/00*    (2006.01)

(52) U.S. Cl.
CPC ............ *G06N 3/126* (2013.01); *G06N 3/006* (2013.01)

(58) Field of Classification Search
CPC .............................. G06N 3/126; G06N 3/006

USPC .............................................................. 703/2
See application file for complete search history.

(56) References Cited

U.S. PATENT DOCUMENTS

| 7,343,363 | B1 * | 3/2008 | Parker | G06N 5/02 706/45 |
| 2002/0099929 | A1 | 7/2002 | Jin et al. | |
| 2005/0118612 | A1 * | 6/2005 | Bonabeau | G06N 3/126 435/6.15 |
| 2007/0162496 | A1 * | 7/2007 | Pulfer | G06Q 10/06 |

(Continued)

FOREIGN PATENT DOCUMENTS

| EP | 1717755 A2 | 11/2006 |
| EP | 2485190 A1 | 8/2012 |

(Continued)

OTHER PUBLICATIONS

Babu et al., "Multiobjective Optimization Using Differential Evolution", Department of Chemical Engineering, Birla Institute of Technology & Science, Pilani 333031 (Rajasthan) India, pp. 1-8.

(Continued)

*Primary Examiner* — Dwin M Craig
(74) *Attorney, Agent, or Firm* — Colby Nipper PLLC

(57) ABSTRACT

New methods of data processing include a suite of tools which may be used for, among other purposes, history matching of hydrocarbon reservoir models. The suite of tools includes asynchronous techniques for solving optimization problems, visualization tools for providing an audit trail of users' work, and a low cost grouping technique for efficient processing and displaying of scatter plot and other graphical data.

20 Claims, 11 Drawing Sheets
(2 of 11 Drawing Sheet(s) Filed in Color)

(56) References Cited

U.S. PATENT DOCUMENTS

| | | | |
|---|---|---|---|
| 2008/0077371 A1* | 3/2008 | Yeten | E21B 43/00 703/10 |
| 2008/0133550 A1* | 6/2008 | Orangi | G06Q 10/087 |
| 2009/0006430 A1* | 1/2009 | Steinglass | G06Q 10/06 |
| 2010/0161300 A1* | 6/2010 | Yeten | E21B 43/00 703/10 |
| 2010/0293121 A1 | 11/2010 | Ferringer et al. | |
| 2011/0010142 A1 | 1/2011 | Ding et al. | |
| 2011/0050702 A1 | 3/2011 | Heimendinger | |

FOREIGN PATENT DOCUMENTS

| | | |
|---|---|---|
| WO | 0203716 A1 | 1/2002 |
| WO | 2006003484 A2 | 1/2006 |
| WO | 2012003007 A1 | 1/2012 |

OTHER PUBLICATIONS

Bachthaler et al., Eurographics/IEEE-VGTC Symposium on Visualization 2009, vol. 28 (2009), No. 3.
Boost Scatter Plot Performance, Tableau Support Community, Aug. 31, 2013.
Coello et al., "MOPSO: A Proposal for Multiple Objective Particle Swarm Optimization".
Das et al., "Differential Evolution: A Survey of the State-of-the-Art" IEEE Transactions on Evolutionary Computation, vol. 15, No. 1, Feb. 2011, pp. 4-31.
Flom, "Using the SG Procedures to Create and Enhance Scatter Plots", NESUG 2011, Posters, pp. 1-12.
Improving Performance by Avoiding Drawing Multi . . . , Tableau Support Community, Aug. 31, 2013.
Javascript Scatter Chart Renderer 1.0 Component Specification.
Kennedy et al., "Particle Swarm Optimization", 0-7803-2768-3/95 1995 IEEE, pp. 1942-1948.
Romeu, "History Matching and Forecasting" Technology Focus, JPT, Apr. 2010, pp. 80-88.
Schulze-Riegert et al., "Modern Techniques for History Matching", 9th International Forum on Reservoir Simulation, Dec. 9-13, 2007, Abu Dhabi, UAE, pp. 1-48.

* cited by examiner

METHODS FOR EVALUATING AND SIMULATING DATA

This application claims priority and is entitled to the filing date of U.S. Provisional application Ser. No. 61/876,712 filed Sep. 11, 2013, and entitled "Relating to Data Processing" and further claims priority and is entitled to the filing dates of GB application Nos. 1316208.6 and 1316207.8 both filed Sep. 11, 2013. The contents of the aforementioned application are incorporated by reference herein.

BACKGROUND

Applicants hereby incorporate herein by reference any and all U.S. patents and U.S. patent applications cited or referred to in this application.

The present disclosure relates to data processing, and in particular to optimisation techniques, computer simulation and data processing.

Improved optimisation techniques may relate in particular to systems and methods for the optimisation of problems that take varying times to compute, and to new systems and methods for history matching analysis of fluid reservoirs such as hydrocarbon reservoirs.

Optimisation techniques involving metaheuristic and stochastic techniques such as particle swarm optimisation (PSO) and differential evolution (DE) algorithms are computationally expensive. Even with parallelisation of the processing of candidate solutions, processing times for these techniques can be very slow.

Improved computer simulation may relate in particular to improved visualisation techniques for development of computer models used for simulations.

Computer models are used to solve various computationally complex problems for modelling and simulating the behaviour of various systems. Once a model is constructed due to the stochastic nature of optimisation various investigations should be carried out by running multiple simulations.

It is desirable to adapt a model to take account of historical data or other observations. However, for complex systems, successive model versions may be derived far apart in time and may be worked on by multiple users, which makes it difficult to maintain an overview of how a model has developed in the past.

Improved data processing may relate in particular to methods of rendering data in graphical form.

SUMMARY OF THE DISCLOSURE

According to a first aspect of the disclosure there is provided a computerised method for optimising an objective function comprising:
  evaluating an objective score for each of a plurality of candidate solutions;
  updating one or more solutions based on the evaluated objective score(s);
  repeating said steps of evaluating and updating until a stopping criterion is met;
wherein:
  evaluating objective scores is carried out across a plurality of worker processors; and
  a master processor receives objective scores from the worker processors and updates said one more solutions asynchronously.

Optionally, each worker processor evaluates one candidate solution at a time.

Optionally, work is allocated to the worker processors when they are idle.

Optionally, during an evaluation period for a first candidate solution, one or more successive evaluation and update cycles can be performed for one or more other candidate solutions.

Optionally, each candidate solution is a particle in a particle swarm optimisation algorithm.

Optionally, each candidate solution is a chromosome in an evolutionary or a genetic algorithm.

Optionally, said evolutionary algorithm is a differential evolution algorithm.

Optionally, said optimising an objective function is carried out for history matching of a hydrocarbon reservoir model.

According to a second aspect of the disclosure there is provided apparatus for optimising an objective function comprising a master processor and one or more worker processors, wherein said worker processors are arranged to evaluate an objective score for each of a plurality of candidate solutions; and said master processor is arranged to receive objective scores from the worker processors and asynchronously update one or more solutions based on the evaluated objective score(s); and wherein said evaluation and updating are repeated until a stopping criterion is met.

According to a third aspect of the disclosure there is provided a method of building a model of a hydrocarbon reservoir by optimising an objective function that scores simulated results against a model; comprising
  evaluating an objective score for each of a plurality of simulated solutions;
  updating one or more agents based on the evaluated objective score(s) from their candidate solutions;
  repeating said steps of evaluating and updating until a stopping criterion is met;
wherein:
  evaluating objective scores is carried out across a plurality of worker processors; and
  a master processor receives objective scores from the worker processors and updates said one more solutions asynchronously.

Optionally, the objective function comprises an error or misfit between simulated and observed data.

According to a fourth aspect of the disclosure there is provided apparatus for building a model of a hydrocarbon reservoir by optimising an objective function that scores simulated results against a model; comprising a master processor and one or more worker processors, wherein said worker processors are arranged to evaluate an objective score for each of a plurality of candidate solutions; and said master processor is arranged to receive objective scores from the worker processors and asynchronously update one or more solutions based on the evaluated objective score(s); and wherein said evaluation and updating are repeated until a stopping criterion is met.

According to a fifth aspect of the disclosure there is provided a computer program product that includes instructions that, when run on a computer, enable it to act as a master processor or as a worker processor; such that a master processor in combination with one or more worker processors can be provided for the performance of the methods or the provision of the apparatus of the previous aspects.

According to a sixth aspect of the disclosure there is provided a method for visualizing the development of a computer model by a user or team of users, comprising displaying model version symbols which represent different versions of the model and linking the model version symbols with dependency symbols illustrating a development path of the model.

Optionally, the model version symbols are visually differentiated from each other to represent different types of investigation that have been applied to a preceding model version.

Optionally, one type of investigation is associated with one colour of a model version symbol.

Optionally, one type of investigation is associated with one shape of a model version symbol.

Optionally, the types of investigation that can be visually differentiated comprise one or more of: history matching; forecasting; optimisation.

Optionally, the method comprises displaying user identity symbols.

Optionally, the user identity symbols comprise graphical indicators that are applied to the dependency symbols.

Optionally, the user identity symbols comprise graphical indicators that are applied to the model version symbols.

Optionally the graphical indicators comprise different colours or other visual indicators which are each associated with a particular user.

Optionally, the model version symbols comprise interactive graphical elements.

Optionally, interaction with the model version symbols reveals further information and/or links to further resources or interaction elements.

Optionally, said further information includes one or more of: a version number, details of when the version was created and who by, a high level description as to what changed from the preceding version.

Optionally, said interaction elements comprise elements for interacting with the model through one or more of: commenting, linking a source and opening the model.

Optionally, the model version symbols are expandable to reveal more granular information about the changes that have been made between model versions.

Optionally, each incremental change made to the model is represented by an incremental change graphical symbol.

Optionally the incremental change graphical symbol comprises an interactive element which enables a user to reveal further information and/or links to further resources or interaction elements.

Optionally, the displayed model version symbols can be re-aligned with respect to time.

Optionally, two or more model version symbols or incremental change graphical symbols can be compared.

Optionally, the model is a model of a fluid reservoir, preferably a hydrocarbon reservoir.

According to a seventh aspect of the disclosure there is provided a visualisation tool for visualizing the development of a computer model by a user or team of users, comprising a display engine arranged to display model version symbols which represent different versions of the model and to link the model version symbols with dependency symbols illustrating a development path of the model.

According to a eighth aspect of the disclosure there is provided a computer program product comprising instructions that, when run on a computer, enable it to function as the tool of the second aspect.

According to a ninth aspect of the disclosure there is provided a method of displaying data comprising grouping the data to form a grouped representation of the data, and displaying said grouped representation; wherein said grouping is carried out to fit an available region of a graphical output device.

Optionally said available region is an available pixel region. Alternatively, said available region is an available print region.

Optionally, grouping the data comprises aggregating the data by data binning.

Optionally, the graphical output device is a display screen.

Optionally, the binned data is output as a scatter plot with each datum represented by a graphical symbol.

Optionally a first axis of data to be plotted is binned; and then a second axis of data to be plotted is binned for each bin of the first axis that contains two or more data.

Optionally binning the data along an axis comprises:
calculating a number of bins by dividing a number of output device pixels by a characteristic pixel dimension of a graphical symbol used to represent each datum;
determining lower and upper bounds for each bin based on a range of an axis to be displayed and the number of bins; and
allocating each datum to a bin depending on its value for that axis.

Optionally the range of an axis to be displayed comprises a lower axis bound and an upper axis bound, as defined by the data.

Optionally each bin has a size parameter associated with it that represents the number of data that the bin comprises.

Optionally the grouped binned data are altered visually according to the size parameter, to represent the number of data that each bin comprises.

Optionally said visual alteration comprises varying an opacity value of a grouped datum.

Optionally, a grouped representation is redrawn according to new boundaries in response to a zoom command.

According to a tenth aspect of the disclosure there is provided a system for displaying data comprising:
a database storing a plurality of data;
a graphical output device comprising means to present data in a pixel region;
a processor arranged to group the data to form a grouped representation of the data, and to provide commands to display said grouped representation; wherein said grouping is carried out to fit an available region of the graphical output device.

Optionally said available region is an available pixel region. Alternatively, said available region is an available print region.

Optionally, the processor comprises a data binning component.

Optionally, the graphical output device is a display screen.

Optionally, the display screen is provided as a component part of a computing device.

Optionally, the system comprises a server comprising said database and said processor, and said graphical output device is a client of the server or is provided as part of a client device of the server.

Optionally, the server is a web server and the client device runs a browser application for accessing the data.

According to a eleventh aspect of the disclosure there is provided a computer program product that includes instructions that when run on a computer, enable it to bin data to fit an available region of a graphical output device.

Optionally said available region is an available pixel region. Alternatively, said available region is an available print region.

According to a twelfth aspect of the disclosure there is provided a computer program product that includes instructions that when run on a computer, enable it to request data from a database which is binned to fit an available region of a graphical output device associated with the computer running the instructions.

Optionally said available region is an available pixel region. Alternatively, said available region is an available print region.

The computer program products of any of the aspects mentioned above and described herein may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fibre optic cable, twisted pair, digital subscriber line (DSL), or wireless technologies such as infra-red, radio, and microwave, then the coaxial cable, fibre optic cable, twisted pair, DSL, or wireless technologies such as infra-red, radio, and microwave are included in the definition of medium.

Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure will be described below, by way of example only, with reference to the accompanying drawings, in which:

FIG. 10 illustrates the grouping together of data depending on which bin they lie in.

DETAILED DESCRIPTION

Figure 1:
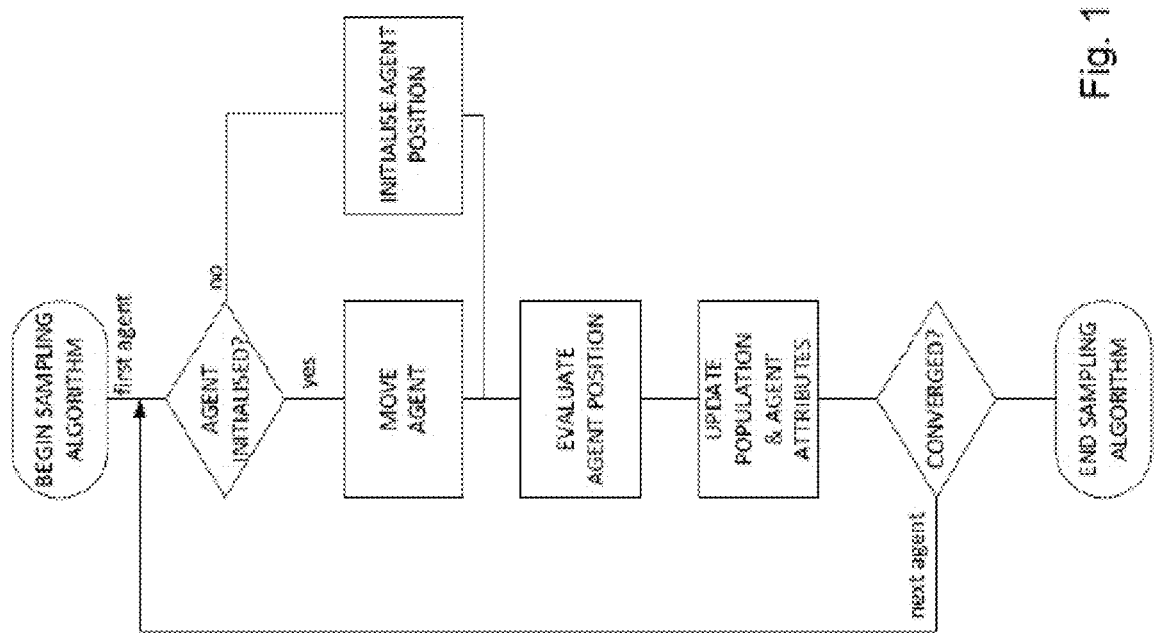
FIG. 1 shows a flowchart outlining the operation of a sampling algorithm.

Referring to the first to fifth aspects: sampling algorithms utilise a population of candidate solutions, also known as "agents", to explore the topography of an optimisation problem with a view to finding a globally optimal solution. Each sampling algorithm (SA) guides the search process in its own unique way but a general approach is illustrated in FIG. 1. First of all, each agent is randomly initialized by randomly defining its attributes, for example its position. An agent's position is evaluated to obtain a corresponding score. The agent's attributes are then updated based on the corresponding score which may result in an updated population state, then the agents are moved again and the evaluation and update of agent attributes and population state is repeated until a stopping criteria is reached.

The procedure detailed in FIG. 1 could be implemented on a single thread or a single processor (CPU) because each agent is moved and evaluated in turn. Whilst each calculation has access to the very latest state of the population, in practice because a serial implementation is dependent on the evaluation time of each candidate solution, the optimisation process can take a large amount of time for complex evaluation stages.

Figure 2:
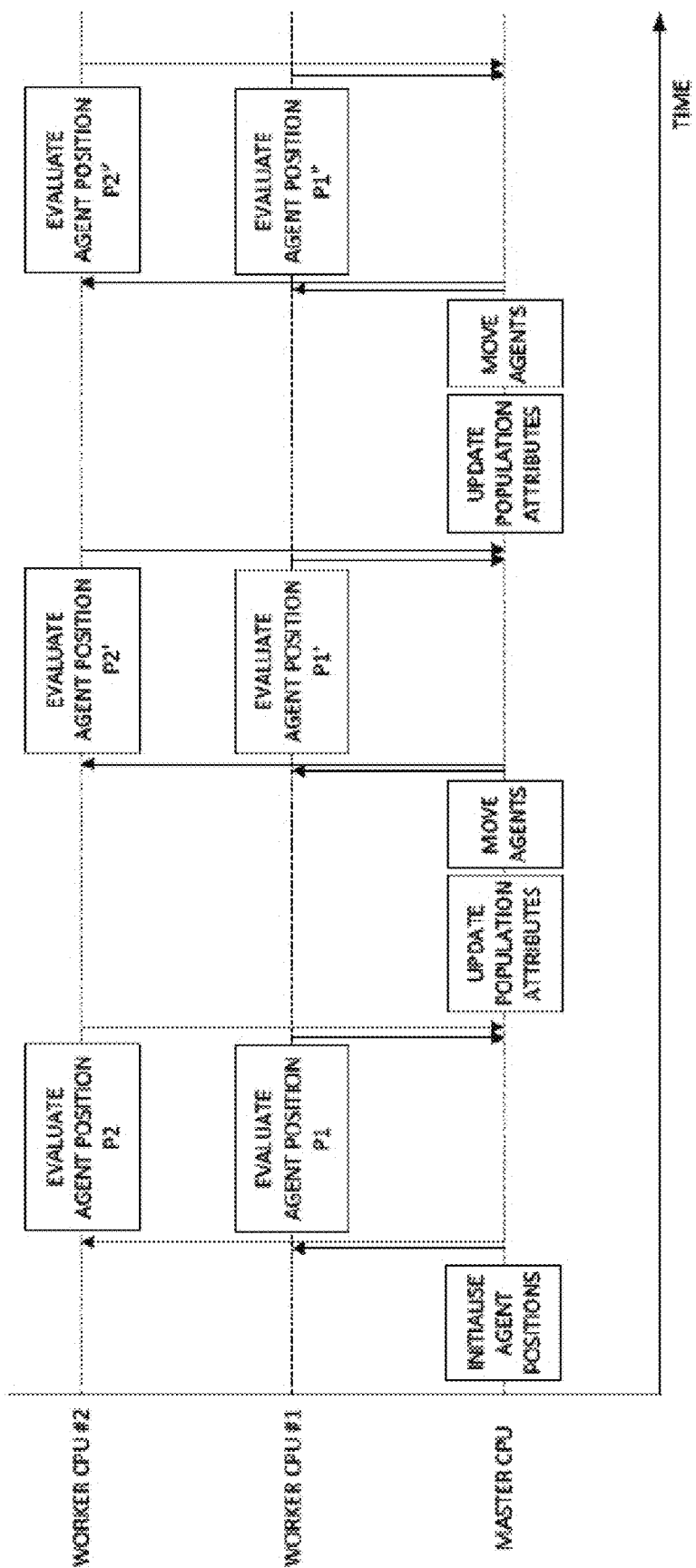
FIG. 2 shows a sequence diagram for synchronous implementation of a sampling algorithm in parallel.

The speed of optimising a model can be improved by carrying out the evaluation of candidates in parallel, across multiple threads and/or multiple CPUs. The concept of an agent readily lends itself to this idea. FIG. 2 illustrates an implementation of a sampling algorithm on multiple CPUs. The potential for speeding up processing is clear as agent candidate solutions may be evaluated simultaneously.

The figure illustrates a master CPU issuing instructions to two worker CPUs which each process one agent, although it is to be appreciated that this is for ease of illustration and in fact any number of worker CPUs can be provided, one CPU can process multiple agents, and one agent can be processed by different CPUs in successive evaluation cycles. Every agent candidate solution in the population must be evaluated and the agent updated (i.e. a complete generation) before the algorithm continues. This synchronous approach is in keeping with the design and intention of a sampling algorithm which evolves only when the population state is up to date, ensuring the latest information is utilised when an agent generates a new candidate solution. This works well when the evaluation time is likely to be around the same on each CPU.

However in many cases, for example reservoir history matching evaluation (i.e. simulation), there can be a wide variation in processing times, due to three potential reasons:
1. The candidate solution that the agent generates (the agent's position) creates a more computationally complex model which takes longer to evaluate.
2. Varying CPU power across a non-homogeneous cluster/grid which results in unpredictable evaluation time.

3. Increased parallelisation of a problem results in bottlenecks within data access on the network which can increase wait times within the evaluation process.

Figure 3:
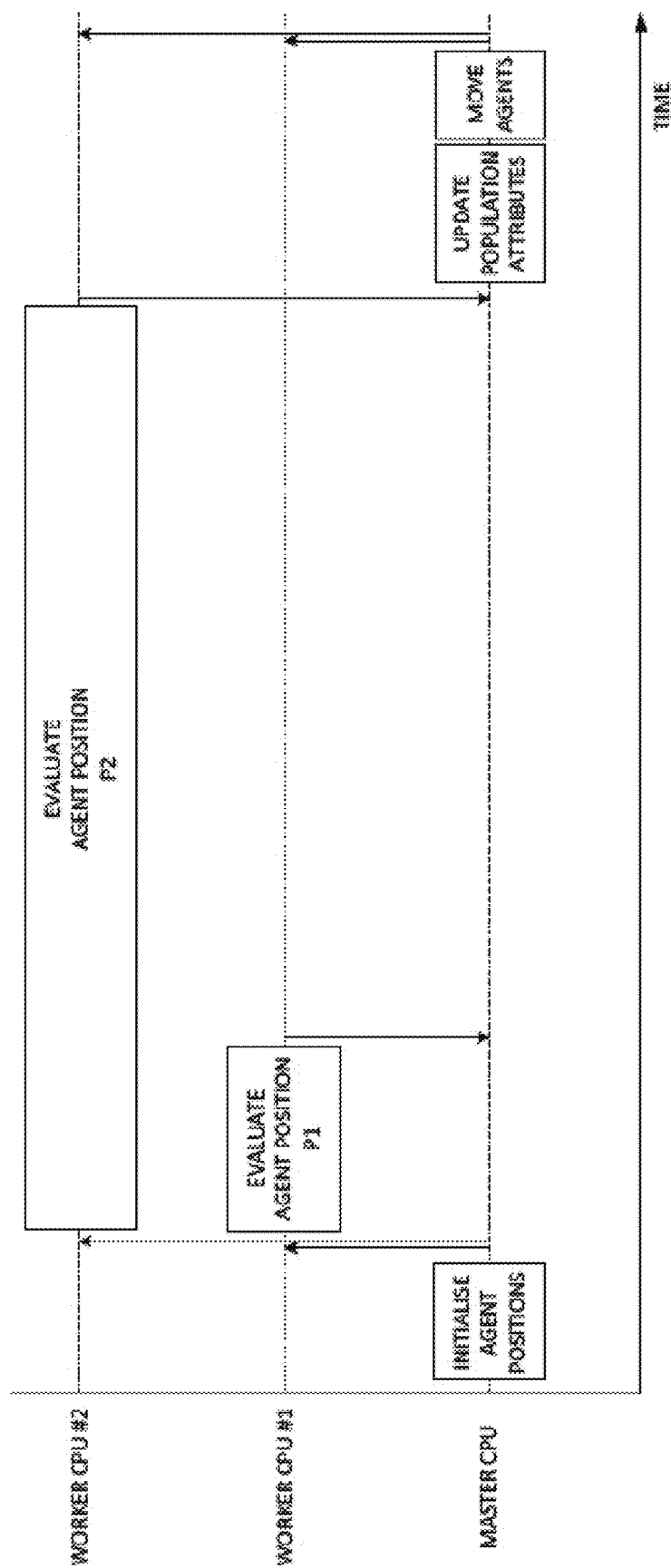
FIG. 3 shows a sequence diagram for synchronous implementation of a sampling algorithm in parallel where evaluation times vary.

This means that synchronous parallel implementations are subject to potentially significant delays which can counteract any speed gains that a parallel implementation has over a serial implementation. This is illustrated in FIG. 3 where the master CPU must wait for CPU #2 to complete its processing before it can allow the sampling algorithm to continue.

This issue may be addressed by implementing the sampling algorithm update and candidate solution generation in an asynchronous manner. With an asynchronous implementation the population state is updated with every new evaluation that is returned. However, because work is continuing in parallel it is possible that candidate solutions are generated by an agent whilst its attributes are out of date with respect to itself i.e. it has generated multiple future positions before the previous ones have been returned from evaluation. So although the system is as up to date as possible it will generate new work without having all work in progress returned with a score. This contrasts with a synchronous implementation which would halt the generation of new positions until work in progress has been evaluated. The effect of this is that the asynchronous implementation can be described as more explorative although when the evaluations return, the trajectory of the agent can sharply change. All agents within the system continue to generate positions whilst their previous ones are being evaluated.

Figure 4:
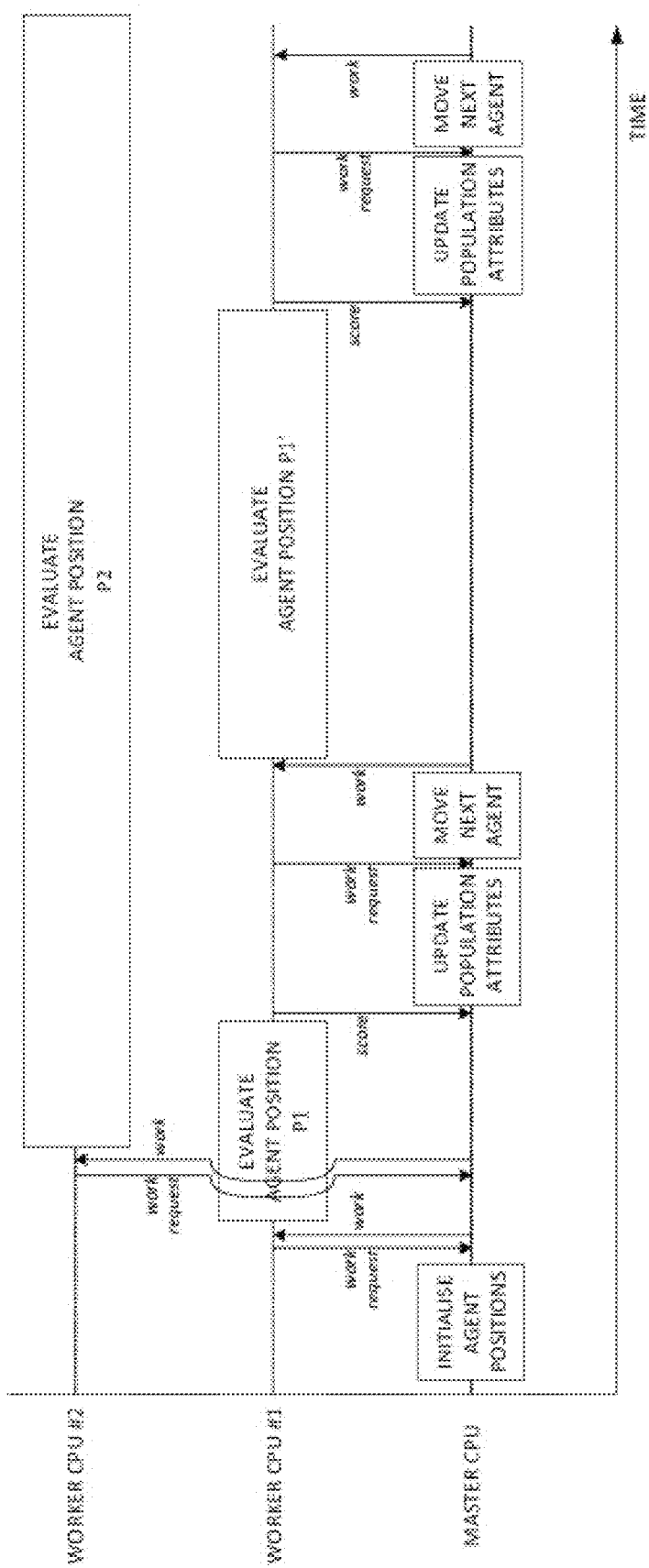
FIG. 4 shows a sequence diagram for asynchronous implementation of a sampling algorithm in parallel where evaluation times vary.

An example of this is shown in FIG. 4. In this case when a worker CPU is idle or has capacity for evaluating an agent, it sends a work request to the master CPU. The master CPU responds to work requests by either issuing work to the worker CPU or informing the worker CPU that it should die: this arrangement is based on the worker farm design pattern.

This asynchronous approach means that prolonged processing in the evaluation phase on one CPU does not disrupt processing on the other CPUs. As illustrated in FIG. 4, even though the evaluation of agent position P2 by worker CPU#2 is prolonged, the population state and agent attributes can be updated once the evaluation of the first agent position P1 is complete, and the worker CPU#1 can be deployed to evaluate the next position P1' of the first agent and update the population state and agent attributes once that evaluation is complete, all before the evaluation of the agent position P2 is completed.

Implementing sampling algorithms in an asynchronous manner has the potential to influence the way in which SA algorithms function in practice. It can be inferred from the sequence diagram in FIG. 4 that new candidate solutions are generated for idle processors without requiring the evaluation of all candidate solutions to return. Although the generation of P1' would benefit from knowing the score from P2, the SA generates the best position possible based on the state it has at the time.

However, the use of incomplete data is not an issue, as many more evaluations are possible within the same time frame. As evaluations are returned the algorithms update to reflect this new information—even though the population state may be way beyond the evaluation returned, if the score returned demonstrates the continued development of the agent was poor the new data are used to guide subsequent candidate solutions. This update ensures that although an evaluation took a long time, its score is still adhered to as per the algorithm definition.

The algorithm is not adversely affected by allowing an agent to continue past an evaluation, should more work be needed, without its score being returned. This is because of the stochastic nature of the problem space. By introducing the incomplete data effect we enable the algorithm to explore the solution space more widely without being drawn into local (and not always the global) minima too quickly. This makes the algorithm more efficient in terms of processing time but also more robust to the unpredictable solution surface.

Figure 5:
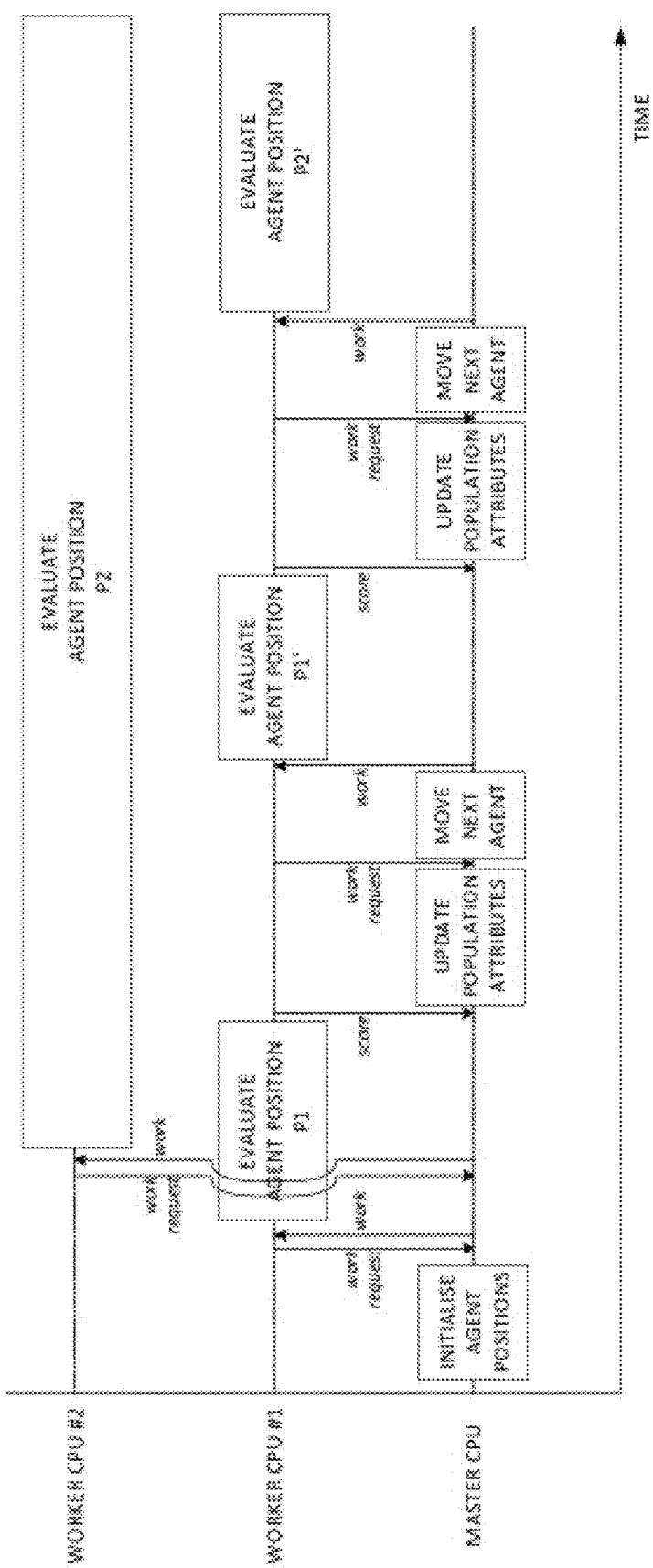
FIG. 5 shows a sequence diagram for asynchronous implementation of a sampling algorithm in parallel where evaluation times vary, illustrating parallel evaluation of an agent.

It is also possible for a specific agent to be evaluated on multiple CPUs at the same time. FIG. 5 illustrates this scenario. Whilst CPU#2 is evaluating the position of agent 2, CPU#1 requests work and is given another position for agent 2. Apart from a prolonged evaluation phase on a CPU, this could also occur in the case where there are more CPUs available for processing compared to the number of agents.

The effect of this simultaneous agent processing is specific to each particular SA.

In one embodiment, the SA is a particle swarm optimisation (PSO) algorithm. In this case the agent is modelled as a particle in a swarm of particles exploring the parameter space. The effect of requesting a secondary position would be to move the particle on from its primary position (the one being evaluated). Upon completion of multiple evaluations only the global best position for the swarm or the local best position for the particle are updated if an improved score has been returned. The implication is that that the particle will not return to its primary position were that found to be better. However, subsequent moves will be influenced by the new global or local best positions such that its direction of movement is affected by its earlier position.

In one embodiment, the SA is a differential evolution (DE) algorithm. In this case the agent is modelled as a chromosome in a population exploring the parameter space. The effect of requesting a secondary position would be to produce (breed) another trial chromosome.

Upon completion of any evaluation the chromosome's current position is only replaced by that of the trial chromosome if an improved score is apparent. In this case there is scope for a chromosome to move to a sibling (a trial position generated by its current position's parent) location were it found to be an improvement. Similarly, should any of its previous position's trial positions show an improvement over its new position, it will move to them (i.e. its nephew).

These techniques may have application in various areas. One such area is history matching for fluid reservoirs, such as hydrocarbon reservoirs.

A hydrocarbon reservoir may comprise a petroleum reservoir, a natural gas reservoir, or a reservoir with a combination of petroleum and natural gas. Petroleum comprises a mixture of various hydrocarbons and other compounds in liquid form, while natural gas comprises a mix of hydrocarbon gases. The term "hydrocarbon" as used herein is a generic term for petroleum and/or natural gas unless the context dictates otherwise.

In hydrocarbon reservoirs, the hydrocarbons are generally stored within rock formations and are extracted by drilling a well bore and recovering the hydrocarbons through various techniques which include (as a non-exhaustive set of examples); natural underground pressure, injection of water, acid or gas, or (for petroleum) by injection of steam to reduce petroleum viscosity to make it easier to extract.

Hydrocarbon reservoirs can be modelled in computer-based reservoir simulation models. Many different techniques are available but generally speaking the reservoir is modelled as a set of three-dimensional volume elements, known as cells. A set of parameters is then modelled on a per-cell basis, which define various geological or petrochemical properties for each cell. Variations in these parameters between cells are used to model the variations in the rock formations of the reservoir. Example properties that can be defined include porosity, permeability and water saturation.

Parameters for the reservoir model are determined by various inspection techniques such as seismic surveys and sampling of specific points or areas of the reservoir. However there is inherently some uncertainty in the model due to the inhomogeneity of the reservoir and the relatively sparse set of samples or readings that can be taken.

One use of a reservoir model is to predict the hydrocarbon output of a reservoir over time. However because of the uncertainties involved in the formation of the model, it is difficult to make accurate estimations. Therefore, it has been proposed to compare simulations with historical production data, in a process known as history matching. A sampling algorithm acts to minimise an objective function which is representative of the misfit (also referred to as mismatch) between measured and estimated parameters. In single objective history matching, a single match quality number is defined that is used by the algorithm to seek better solutions. In multi-objective history matching, the objective is broken down into separate match quality components and an optimal trade-off between objectives is determined via a Pareto optimisation.

The techniques of this disclosure may be used for history matching of reservoir models. Each agent of the sampling algorithms employed may represent one possible solution to the objective function to be minimised.

Employing the asynchronous methods of the present disclosure in the context of history matching for hydrocarbon reservoirs means that simulations can be performed more quickly, without affecting the reliability of the predictions. The computing power of multiple CPUs is used efficiently for the simulation of candidate solutions.

The history matching may be used to simulate the hydrocarbon output from a reservoir. Alternatively the history matching can be used for reservoir optimisation, running simulations to predict the effect of proposed new wells or boreholes on hydrocarbon production.

It is also to be appreciated that the techniques of this disclosure can be applied to any optimisation problem in general and including without limitation and as examples only, other areas such as modelling nuclear waste and other subsurface reservoirs, such as carbon capture and storage.

Referring to the sixth to eighth aspects: the disclosure can be applied to computer simulation in general. However, in order to further the reader's understanding of the disclosure's general concepts, one particular example application area will now be discussed. It is to be appreciated that the discussion of this particular example does not limit the scope of the disclosure. The particular example to be discussed, where computer simulations are used, is in the modelling of fluid reservoirs, such as hydrocarbon reservoirs.

A hydrocarbon reservoir may comprise a petroleum reservoir, a natural gas reservoir, or a reservoir with a combination of petroleum and natural gas. Petroleum comprises a mixture of various hydrocarbons and other compounds in liquid form, while natural gas comprises a mix of hydrocarbon gases. The term "hydrocarbon" as used herein is a generic term for petroleum and/or natural gas unless the context dictates otherwise.

In hydrocarbon reservoirs, the hydrocarbons are generally stored within rock formations and are extracted by drilling a well bore and recovering the hydrocarbons through various techniques which include (as a non-exhaustive set of examples); natural underground pressure, injection of water, acid or gas, or (for petroleum) by injection of steam to reduce petroleum viscosity to make it easier to extract.

Hydrocarbon reservoirs can be modelled in computer-based reservoir simulation models. Many different techniques are available but generally speaking the reservoir is modelled as a set of three-dimensional volume elements, known as cells. A set of parameters is then modelled on a per-cell basis, which define various geological or petrochemical properties for each cell. Variations in these parameters between cells are used to model the variations in the rock formations of the reservoir. Example properties that can be defined include porosity, permeability and water saturation.

Parameters for the reservoir model are determined by various inspection techniques such as seismic surveys and sampling of specific points or areas of the reservoir. However there is inherently some uncertainty in the model due to the inhomogeneity of the reservoir and the relatively sparse set of samples or readings that can be taken.

One use of a reservoir model is to predict the hydrocarbon output of a reservoir over time. However because of the uncertainties involved in the formation of the model, it is difficult to make accurate estimations. Therefore, it has been proposed to compare predictions with historical production data, in a model validation process known as history matching. A sampling algorithm acts to minimise an objective function which is representative of the misfit (also referred to as mismatch) between measured and estimated parameters. In single objective history matching, a single match quality number is defined that is used by the algorithm to seek better solutions. In multi-objective history matching, the objective is broken down into separate match quality components and an optimal trade off between objectives is determined via a Pareto optimisation.

As well as validating the model through history matching techniques, the model can be used to for forecasting, where the solutions from history matching are assigned probabilities and the most likely models run into the future to gain a probabilistic understanding of the uncertainty and future variance within a field and reservoir development optimisation where intelligent sampling algorithms are used to optimise the design and development of a field against an objective, for example finding the most optimal location for a new well to increase oil production. These three areas are all different types of investigations that can be performed with the a model.

A "model" in the context of this particular example embodiment comprises simulator input files, a set of uncertain parameters, a set of objectives and a set of feasibility scripts. In the case of history matching history data is also required. As the user evolves and develops their model to gain a better history match, forecast or optimisation they tweak and change their model. These changes may be based on investigations into the output from previous model versions as well as discussions with colleagues and documents from the company archive.

The development of a model by the user is generally encoded in comments placed at the top of the simulator input files, and sometimes in a text report (though this is usually poorly maintained). The file structure also tends to give a clue as to the evolution of the model, however there is no standard for this so each engineer arranges their files in a way that best makes sense to them.

The conversations around the data are lost amongst long email chains and unrecorded face to face conversations and any archive documents that were used are rarely referenced in a suitable way. Furthermore, this process is a batch process done when enough new data becomes available to make a considerable improvement to justify time to be spent. Therefore these investigations are usually spaced months apart, meaning that both returning engineers and new engineers entering the problem are left at a loss as to how the model developed.

The system of the present disclosure encapsulates information relating to the changes made to a model and provides it to the user in a simple and easy to follow fashion by tracking the changes the user makes and enabling annotations and the attachment of information to the development of the model.

Figure 6:
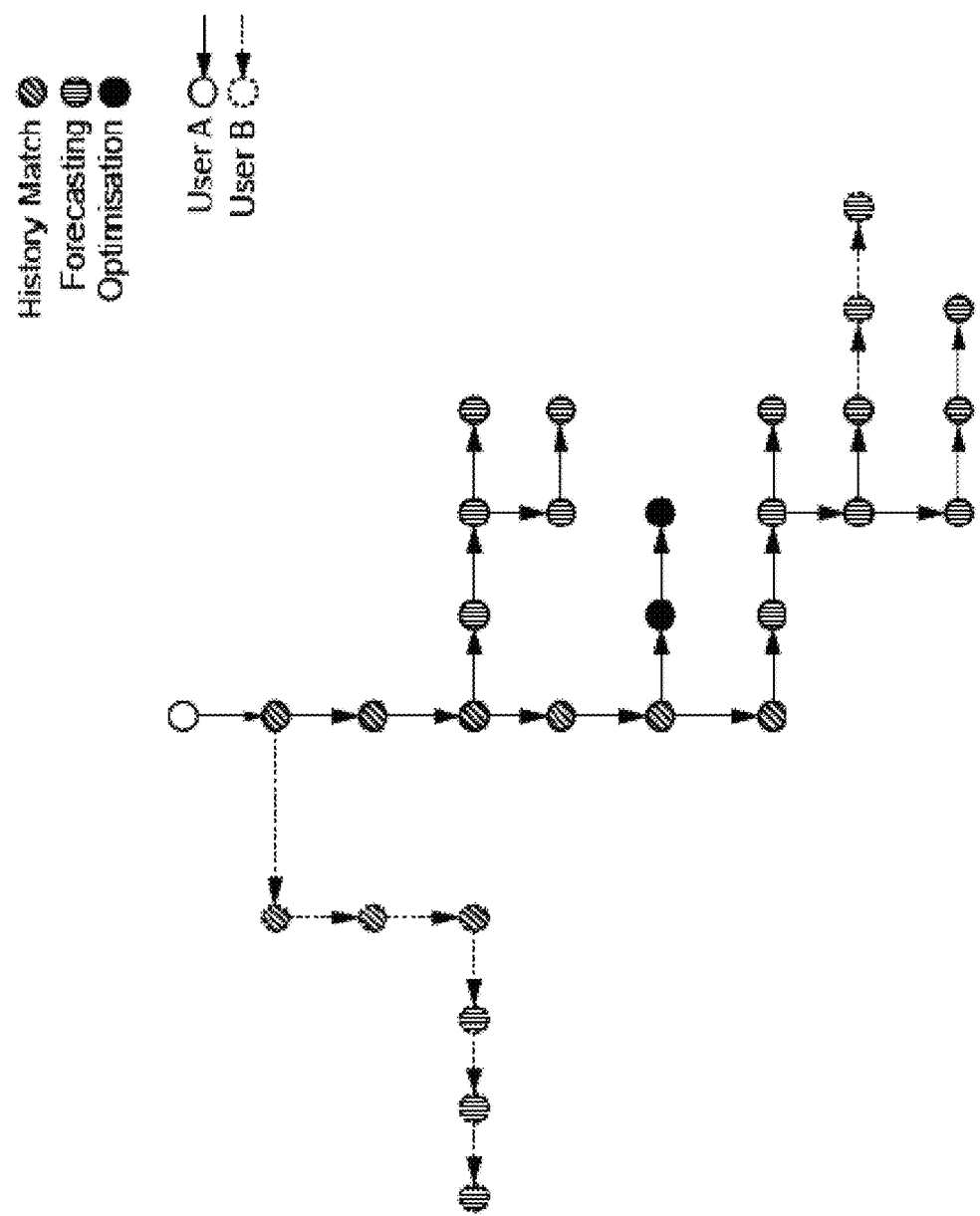
FIG. 6 shows a general overview of a computer model.

FIG. 6 shows an example of an audit trail visualisation, showing various graphical symbols and indicators that may be rendered in order to display or represent various aspects of the changes that have been applied to a model.

Different versions of the model are represented by their own model version symbols, and are linked in a dependency tree form with dependency symbols interposed between model version symbols. In this example, each model version is represented by a circle symbol and each dependency symbol comprises an arrow pointing from an older model version to a newer model version. The dependency symbols therefore illustrate a development path of the model, in other words, the development history of any given model can be observed by inspecting the history of successive past versions as mapped out by the dependency symbols.

The model version symbols may optionally be visually differentiated from each other in order to represent different types of investigation that have been applied to a preceding model version. In this example the different types of simulation activity are differentiated from each other by having different colours associated with them, represented by the different shadings as annotated in the figure. In alternative embodiments, the different types of simulation activity may be visually differentiated from each other by other visual means such as animations, emphasis, size variation, or hatching, for example. It is also possible for different model versions to have different shaped graphical symbols, with each shape being associated with a different type of simulation activity.

The system also optionally includes user identity symbols. In the example of FIG. 6, the user identity symbols comprise graphical indicators that are applied in the form of different colouring of the dependency symbols, where each colour is representative of a particular user who has performed (or has overall responsibility for) the changes applied from one version to the next.

The user identity symbols may also alternatively or in addition comprise a graphical indicator that is applied to the model version symbols. In the example of FIG. 6, the graphical indicator comprises a coloured border around the symbols, where each colour is representative of a particular user who has performed (or has overall responsibility for) the changes applied from one version to the next.

The graphical indicators forming the user identity symbols may alternatively take the form of different line weights or hatchings; or may be independent graphical symbols or elements that are displayed alongside or associated with the model version symbols.

The view of FIG. 6 enables a fast overview of the development of the model, showing the evolution of a model by multiple users. Note that there is no time scale in the figure. The time between modifications is not relevant when putting together an overview of the evolution of the model.

In preferred embodiments, the model version symbols comprise interactive graphical elements. This interactivity allows more detailed information to be quickly accessed via an intuitive interaction with the overview.

Figure 7:
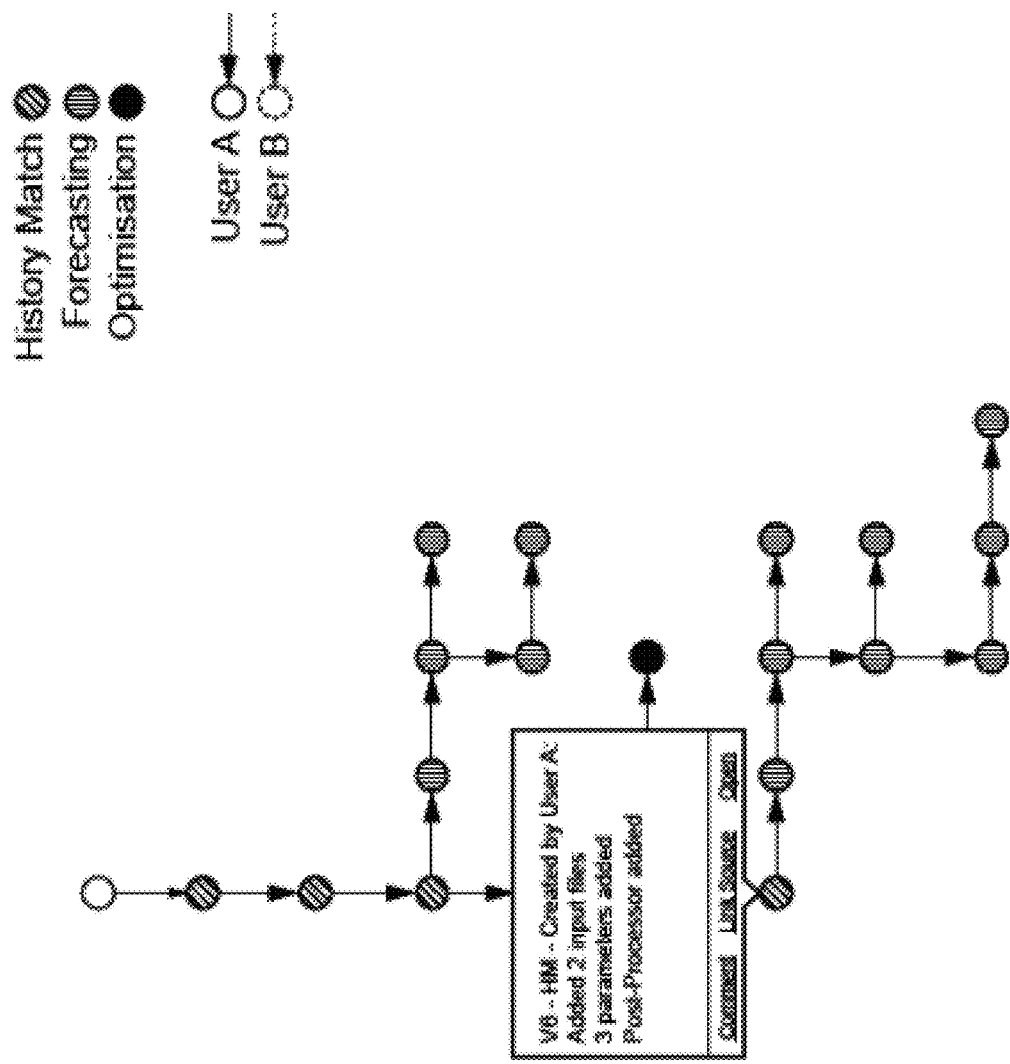
FIG. 7 illustrates the display of further information related to one of the versions of the model shown in the overview of FIG. 6.

For example, as shown in FIG. 7, selection of one symbol in the overview reveals further information and/or links to further resources or interaction elements.

Selection of a symbol may be achieved by any appropriate means. For example, focus can be allocated to a symbol when a cursor of a pointing device such as a mouse or trackpad hovers over the symbol; or the selection of a symbol may be based on the processing of a touch event on or near a touch screen display occurring at the symbol. The further information can be revealed in the form of a pop-up box that appears upon a mouseover or rollover event or any other suitable technique.

In this example the more detailed information includes a version number, details of when the version was created and who by, a high level description as to what changed from the preceding version, and the ability to interact with the model through commenting, linking a source and opening the model.

Linking a source allows a user to attach information that details why the changes were made—this could be a set of graphs/data from the previous model version, a set of documents, or an email train. By attaching this information directly to the version it makes it easier for users to discover the decision and thought process that informed the model.

The audit trail is designed to support users in seeing what the system classes as versions. A version is defined by a model that is executed or run through an investigation (i.e. the user launches jobs and gets results). Each version comprises a collection of changes—this collection may comprise a single change or a group of them. The user can also differentiate milestone or important versions—for example it may be useful to delimit a certain version as the one used to make a business decision. These milestone versions can be differentiated from normal versions through style modifications to the version symbol such as being larger.

It is possible in certain embodiments to expand symbols of a generic overview to reveal more granular information about the changes that have been made between versions; so that a break down of the development can be seen.

Figure 8:
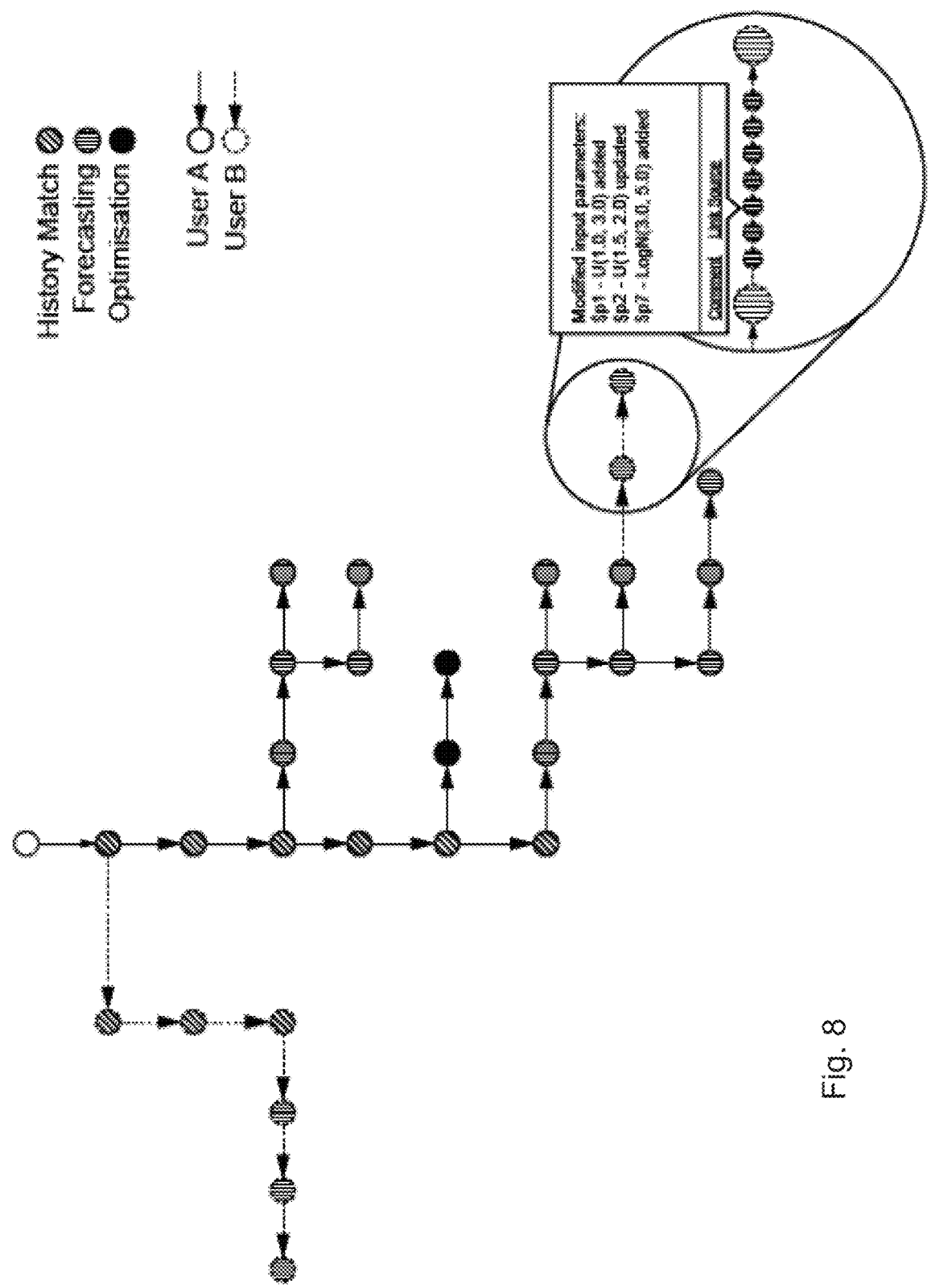
FIG. 8 illustrates the display of expanded information about changes made between versions of the model shown in the overview of FIG. 6.

An example of this is shown in FIG. 8, which demonstrates the ability for the user to expand a graph between two versions in order to gain an understanding of the development and changes made to each section of a model monitored by the system. Each incremental change made to the model is represented by an incremental change graphical symbol, which may for example have a similar shape to that of the model version symbol. The incremental change graphical symbol can be distinguished from a model version symbol by being a different size, preferably smaller.

Graphical indicators representing user identity and type of investigation may also be applied to the incremental change graphical symbols, in a manner similar to that described above.

FIG. 8 shows an embodiment where granular information about the changes made between two different investigations of the same type is displayed. It is also possible to display granular information about the changes made between an investigation of first type and an investigation of a second type. In that scenario, the incremental change graphical symbols may be provided with graphical indicators representing the second type of investigation.

The incremental change graphical symbols may be selected to reveal further information and/or links to further resources or interaction elements, in a similar manner to how the model version symbols are selected as described above.

For example, by selecting one of these incremental changes the user can see what changed to the input files, the parameters, the history data etc. This detail can help users understand specifically what changed very quickly without opening up the model and inspecting it as well as annotating individual changes by linking the source to the increments rather than to the versions themselves—making the audit more granular.

FIGS. 6-8 illustrate the presentation of an audit trail in a concise dependency graph to demonstrate the development of the model relative to each version. It is also possible to re-align the graph with respect to time, so that users can see how a model has developed with respect to an associated project. To support this the graph can be re-aligned to time, for example with a time axis shown to one side and the graph extending downwards.

Figure 9:
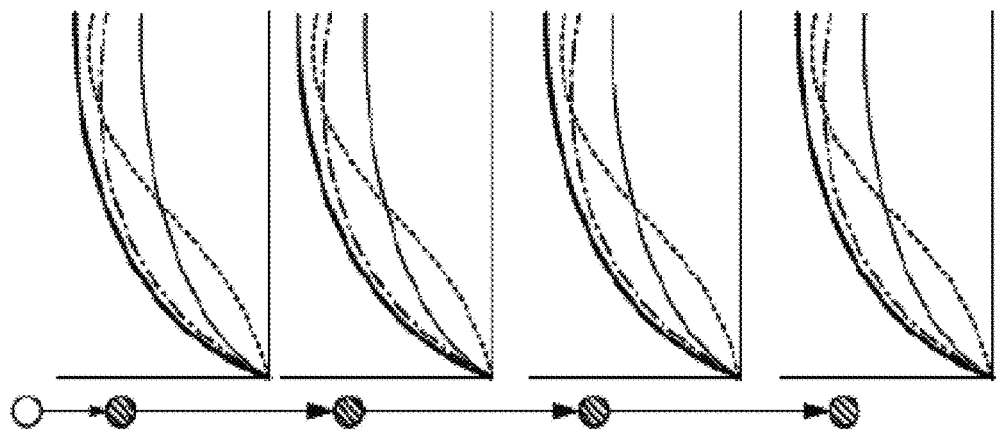
FIG. 9 illustrates a layout for visualizing a comparison between models.

In preferred embodiments a compare function can be provided. Users can select two or more versions from the overview and compare them. This extends the graph and allows the user to compare the best set of models from each version. Although the model comparison used by the system to rate the versions may not be comparable when changes are made, the raw output for the model is comparable so giving the user this overview can enable them to verify they are actually making improvement. An example visualisation for this process is shown in FIG. 9.

Referring to the ninth to twelfth aspects: data is only useful if it can be processed and interpreted, and for this reason graphical representations of data are key tools for helping humans review and understand patterns and trends represented by the data. One popular graphical representation is a scatter plot, where variables are plotted along axes of the plot and each datum is represented as a point on the plot. The representation of each datum may take the form of a graphical symbol, such as a circle, square, triangle or generally any desired shape. Different symbols can be used to represent different data sets.

Graphical representations of data are presented by use of various display technologies, including CRT, LCD or LED displays to name but some of many technologies that are available. The present disclosure is not limited to any type of display technology. A display will have a set of display pixels for displaying information to a user, which defines the resolution of the display. For example, a popular high definition display resolution desktop LCD monitor used for a personal computer may be is 1366×768 pixels in a 16:9 aspect ratio. There are a wide range of display resolutions across desktop monitors and screens for mobile computing devices such as cellular telephones, tablet computing devices, laptops and so on.

As an example, we can imagine a scatter plot with 10,000 points that is 700 pixels wide by 500 pixels tall, and where each point is represented by a circular graphical symbol having a radius of three pixels. It is to be noted that real examples may have many more times that 10,000 data points.

Rendering all 10,000 points on one graph would represent a high resource cost for a computer that is performing the rendering, which could result in either a slow or unresponsive visualization, or even worse, a crash.

Furthermore, users often like to compare multiple graphs side by side for comparison—say up to nine for example. If multiple graphs of similar size need to be plotted, this would represent a still further degradation of performance of a computer rendering the graphs.

For many plots, the available pixel resolution will be less than the resolution of the data points to be plotted. There will be a significant overlap of points when they are rendered for display. In the example mentioned above (10,000 data points to be plotted on a pixel area of 700 by 500 pixels), there will most likely be significant overlap between them when being rendered for display as the points in a realistic plot will most likely never be uniformly distributed.

This overlap can be exploited by grouping data and representing multiple data as a single point on a displayed plot. Grouping points based on the distance between each other works well but requires each point to be checked against every other point which is computationally expensive, so the overall process of obtaining the data, filtering it and then rendering it would take a relatively long time.

The disclosure provides for the rendering data by binning the data to fit the size of an available pixel region of a graphical output device. Data are grouped by breaking an available display area into cells and grouping points which lie within the same cell together.

Figure 10:
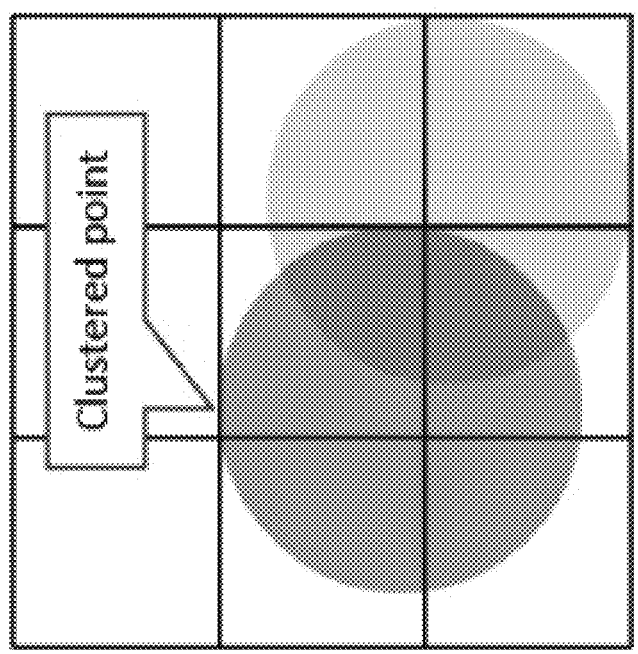
Figure 10:
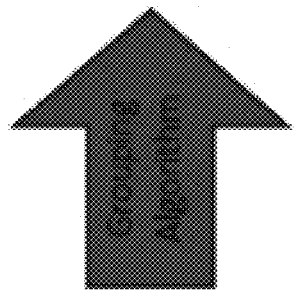
Figure 10:
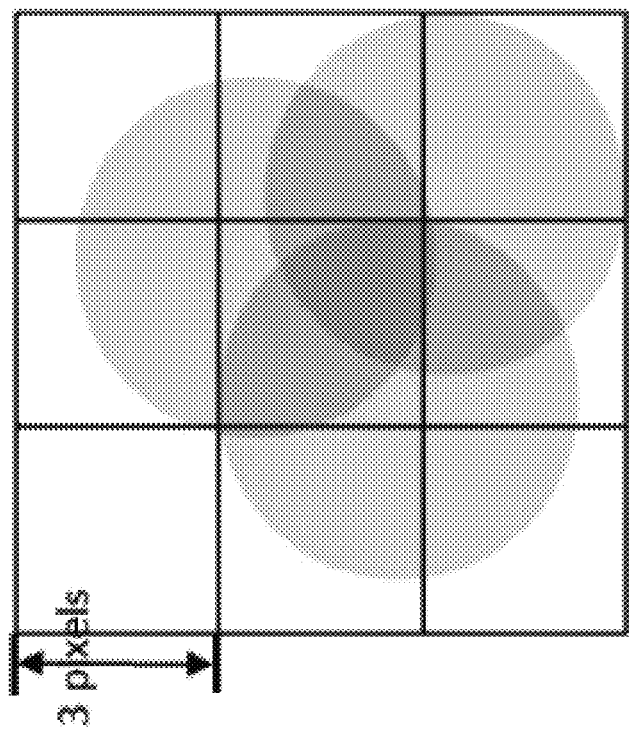

This is illustrated in FIG. 10 which illustrates a selected sub-portion of a display screen. In this example a data point is graphically represented by circle which has a radius of three pixels on a display screen when rendered. Therefore, the display is broken into cells of three pixels square and points lying within each cell are grouped together and plotted as a single point.

When multiple points are grouped together the resulting grouped points assumes the X & Y coordinate of the first point for that group or alternatively the center of the cell for that group. This computationally cheap method is sufficient given the level of overlap that would typically be present. More complex schemes could be employed such as calculating an average of all the group coordinates but it is preferred to avoid this complexity, as for the vast majority of cases it would represent an unnecessary waste of CPU time as the visual difference would be so minor.

In some embodiments, a grouped point may be altered visually to show the number of points it represents, thus creating the illusion that there is more than one point being rendered. This may be achieved by storing a size parameter along with the coordinates of the grouped point, where the size parameter represents the number of raw data that are combined to form a grouped datum. The size parameter can then be used to define a style to be applied to the displayed plot points, for example acting as an opacity scaling factor. As an illustration, if a single non-grouped point is rendered with an opacity of 0.25, a grouped-point representing 3 points may be rendered with an opacity of 0.75. As the grouped point is rendered at 3 times the darkness of a regular point from a distance it would look almost indistinguishable from 3 overlapping points.

The groups may be chosen may by binning the data one dimension at a time. For example, the number of bins can be calculated by dividing the number of available pixels (px) on this axis by the characteristic dimension of the graphical symbol to be displayed (in the example mentioned above and as illustrated in FIG. 10, a circle of three-pixel radius, that is, 700 px/3 px=~234 bins). A bin size can then be calculated by dividing the range of the axis by the number of bins (e.g. if the axis is −10 to 10 then the range would be 20. Thus the bin size would be 20/234=0.0855). The lower and upper bounds of each bin can then be calculated based on the size and number of bins (e.g. first bin would span from −10 to −9.9145, the second from −9.9145 to −9.829, and so on). Each point is then put into a bin depending on its value for that axis.

Using this function we can then create the grouped points. Data is binned along a first axis as described above. Then, for each bin returned that holds two or more points, data is binned along a second axis, but using the range and dimensions of that axis. Data are now grouped and should be packaged in a format that is understandable to by the application running on the client. If the grouped points are to be altered visually (opacity, size etc.) then they should have their size parameter attached to them as well.

It is often desirable when dealing with data visualizations to allow the user to zoom in to further explore the data that are represented. The grouping algorithm described above relies on the relationship between the size of each point, the dimensions of the graph in pixels and the range of the axes. Grouping of data points also results in a loss of detail when the scale of the display axes is increased. Therefore when a user wishes to zoom in on a graph, the grouping algorithm is run again, as both the range of the axes and the pixel spacing between each point will change.

A user may interact through a suitable interface to select an area of a graph that they wish to zoom in on. This may for example be by clicking and dragging to select a rectangular area. When an area has been selected, the lower and upper bounds of the selection box are calculated. New axis ranges are passed back to a database where the raw data are stored, requesting a new subset of the data to be displayed. When retrieving the data needed from the database, only the data which lies within the viewable area is obtained. This reduced dataset is then grouped as described above using the new ranges and rendered on the display. Labels for the axes are also updated to match the selected data.

The grouping algorithm described herein may be implemented in various different ways. In one embodiment, a single computer comprises a database with raw data and an application for rendering a graph on a display screen, and the grouping algorithm operates as part of the application for rendering data from the database. In another embodiment, a database with the raw data may be provided on a server and accessed by a user with a client computing device such as a personal computer, laptop or portable computing device such as a tablet computer or a cell phone. The grouping algorithm may be performed at the server side so that the load on the front-end user application which renders the graph is minimised. The server-side grouping algorithm and client-side rendering engine may suitably be provided as a web application, where the grouped data is served as HTML documents over TCP/IP or HTTP for viewing by an appropriate browser. When the raw data is hosted on a server, it may be on a single server or may be distributed over several devices in a grid or cloud-based manner. When implemented as a web application, new axis ranges needed when zooming can be passed from the front-end to the server by an AJAX call or other suitable technique.

Figure 11:
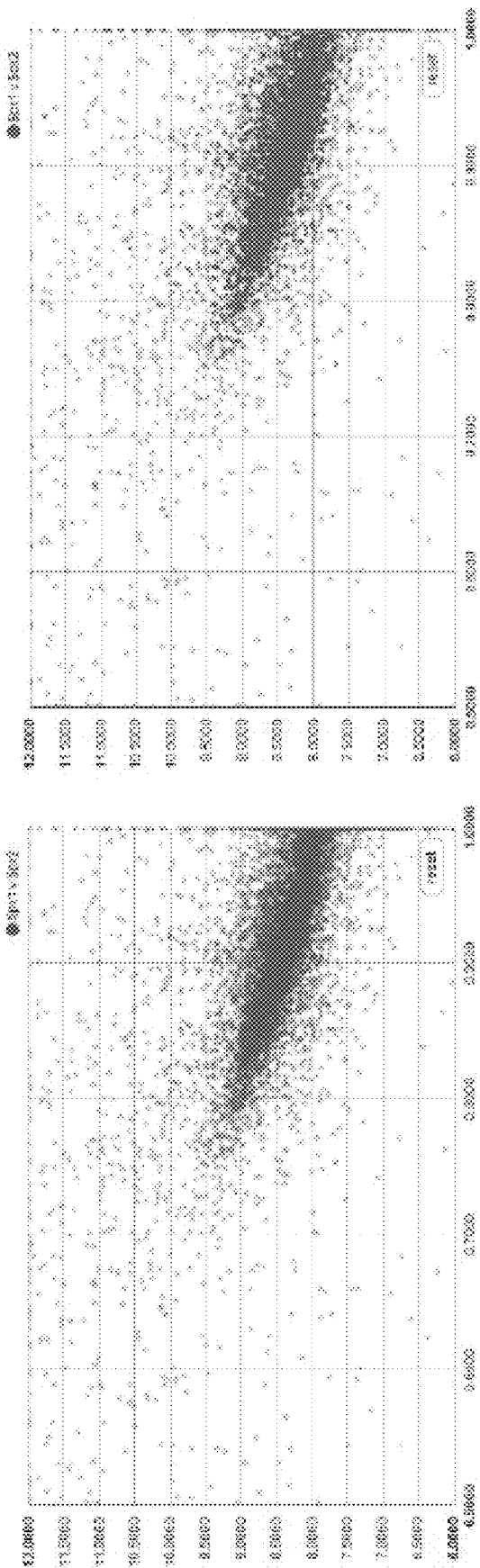
FIG. 11 shows an example application of the disclosure for illustrative purposes.

FIG. 11 illustrates an example application of the disclosure for illustrative purposes. The left hand side shows an example appearance of a plot with ten thousand data points, while the right hand side shows an example appearance of a plot where the methods of the disclosure have been applied and a scatter plot is rendered based on a grouped data set with just two thousand data points. It can be seen that there is no appreciable difference between the two plots, although the one on the right hand side can be rendered much more quickly because the underlying set of data is greatly reduced as compared with the plot of the left hand side.

With the disclosure, high-density multidimensional data can be filtered cheaply on the backend of a web application before it is to be rendered onto a scatterplot by the client. This allows the load on the front-end of the application to be significantly reduced without visibly sacrificing information. This also reduces the data transmitted over an internet connection, making it easier, faster and more reliable to serve high density data to mobile devices or over slower internet connections. The method disclosed is simple and efficient and can be processed quickly enough to enable zooming and similar functions at minimal computational expense.

It will be appreciated that while the embodiments described above have referred primarily to optimising graphical data for display on a display device, the techniques can also be used for a graphical output device that comprises a printer; that is, data can be binned according to an available pixel area that is governed by a printer's print resolution, reducing ink usage.

Various modifications and improvements can be made to the above without departing from the scope of the disclosure. It will be appreciated that the various aspects as described above, and component parts thereof, may be selected and combined.

The invention claimed is:

1. A computerized method for optimizing an objective function for history matching of fluid reservoir models, comprising:
    evaluating an objective score for each of a plurality of fluid reservoir model candidate solutions;
    updating one or more solutions based on the evaluated objective score(s); and
    repeating said steps of evaluating and updating until a stopping criterion is met irrespective of a population state of the objective score(s); wherein:
    evaluating the objective score(s) is carried out across a plurality of worker processors; and
    a master processor receives the objective score(s) from the worker processors and updates said one or more solutions asynchronously, whereby the population state is updated with every new evaluation that is returned from the worker processors without work by any of the worker processors halting, thereby enabling relatively quicker and more reliable modelling of fluid in a reservoir.

2. The method of claim 1, wherein, during an evaluation period for a first candidate solution, one or more successive evaluation and update cycles can be performed for one or more other candidate solutions.

3. The method of claim 1, wherein each candidate solution is a particle in a particle swarm optimization algorithm.

4. The method of claim 1, wherein each candidate solution is a chromosome in a genetic algorithm.

5. The method of claim 1, wherein said optimizing an objective function is carried out for history matching of a hydrocarbon reservoir model.

6. An apparatus for optimizing an objective function comprising a master processor and one or more worker processors which together perform the method of claim 1.

7. The method of claim 1, wherein each candidate solution is a chromosome in an evolutionary algorithm.

8. The method of claim 7, wherein, during an evaluation period for a first candidate solution, one or more successive evaluation and update cycles can be performed for one or more other candidate solutions.

9. The method of claim 7, wherein each candidate solution is a particle in a particle swarm optimization algorithm.

10. The method of claim 7, wherein said optimizing an objective function is carried out for history matching of a hydrocarbon reservoir model.

11. An apparatus for optimizing an objective function comprising a master processor and one or more worker processors which together perform the method of claim 7.

12. The method of claim 3, wherein, during an evaluation period for a first candidate solution, one or more successive evaluation and update cycles can be performed for one or more other candidate solutions.

13. The method of claim 12, wherein said optimizing an objective function is carried out for history matching of a hydrocarbon reservoir model.

14. The method of claim 4, wherein, during an evaluation period for a first candidate solution, one or more successive evaluation and update cycles can be performed for one or more other candidate solutions.

15. The method of claim 14, wherein said optimizing an objective function is carried out for history matching of a hydrocarbon reservoir model.

16. The method of claim 5, wherein, during an evaluation period for a first candidate solution, one or more successive evaluation and update cycles can be performed for one or more other candidate solutions.

17. The method of claim 16, wherein, each candidate solution is a chromosome in an evolutionary algorithm.

18. The method of claim 5, wherein each candidate solution is a particle in a particle swarm optimization algorithm.

19. The method of claim 5, wherein each candidate solution is a chromosome in a genetic algorithm.

20. The method of claim 1, wherein each candidate solution is a particle in a particle swarm optimization algorithm, and wherein each candidate solution is a chromosome in a genetic algorithm.

* * * * *